Figure 1:
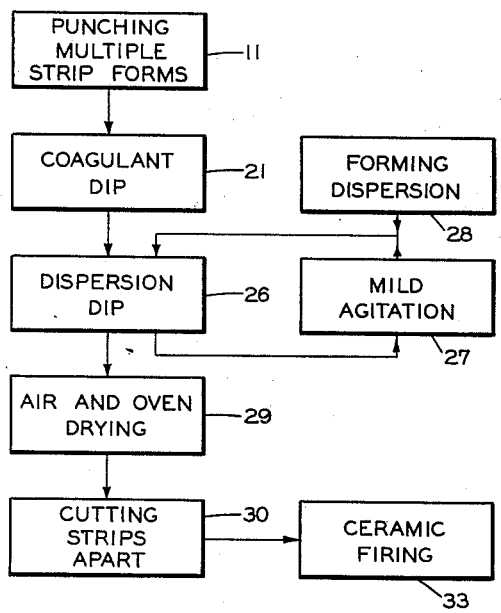

May 22, 1951 C. K. GRAVLEY 2,554,327
METHOD OF MAKING SHAPES OF ELECTROMECHANICALLY
SENSITIVE MATERIAL
Filed June 12, 1948

INVENTOR.
CHARLES K. GRAVLEY
BY Harries A. Mumma Jr.
ATTORNEY

Patented May 22, 1951

2,554,327

UNITED STATES PATENT OFFICE 2,554,327

METHOD OF MAKING SHAPES OF ELECTRO-MECHANICALLY SENSITIVE MATERIAL

Charles K. Gravley, Lakewood, Ohio, assignor to The Brush Development Company, Cleveland, Ohio, a corporation of Ohio Application June 12, 1948, Serial No. 32,588

15 Claims. (Cl. 25—156)

This invention relates to an improved method of making shapes of electro-mechanically sensitive ceramic material and more particularly to such a method using a dispersion of an electro-mechanically sensitive material as the source of the ceramic material. The term "dispersion," as used in this specification and in the appended claims, refers to a dispersion or suspension of small solid particles of a raw material which may be treated by ceramic techniques to form a coherent body of electro-mechanically sensitive material; the fluid medium in which these particles of electro-mechanically sensitive ceramic material are dispersed may contain additional dissolved or dispersed fluid materials.

Electro-mechanically sensitive ceramic materials, particularly certain alkaline earth titanates, may be used advantageously in transducer elements such as electro-acoustical transducer elements and phonograph pickup transducer elements. It is desirable in some applications to fabricate such a titanate element having rather thin walls and in many cases having curved surfaces. The production of elements of these types by the usual methods of molding, extrusion, or slip-casting may be complicated by warping, breakage, and the formation of voids in the element during fabrication. Furthermore, it is difficult to make certain hollow shapes or shapes having highly curved contours by the methods mentioned. For example, the forming of ceramic tubes of generally elliptical cross-sectional shape and tubes with bent axes by these known methods, without the use of a core which is difficult to remove or without some collapsing of the walls of the tube during the forming and ceramic firing thereof, presents difficult problems.

Accordingly, it is an object of the present invention to provide a new and improved method of making shapes of electro-mechanically sensitive ceramic material which substantially avoids one or more of the limitations and disadvantages of the prior methods of making such shapes.

It is also an object of the invention to provide a new and improved method of making hollow shapes and shapes with highly curved contours from an electro-mechanically sensitive ceramic raw material.

It is a further object of the invention to provide a new and improved method of making thin shapes of electro-mechanically sensitive ceramic material from a material of fluid consistency containing particles of ceramic raw material.

In accordance with the invention, the method of making shapes of electro-mechanically sensitive ceramic material comprises applying to a form of unrefractory material an agent for causing coagulation of a ceramic raw material from a dispersion thereof, and subsequently causing contact between this agent on the form and a quantity of the dispersion to effect coagulation of a coating of the ceramic raw material on the form. The method further includes heating the coated form to ceramic-firing temperatures with firing of the coating and elimination of the unrefractory form to leave a coherent shape of electro-mechanically sensitive poly-crystalline ceramic material. The term "unrefractory material," as used in the specification and in the appended claims, is intended to mean a material which cannot resist ceramic-firing temperatures and which burns, melts, vaporizes, or otherwise disintegrates at such temperatures.

For a better understanding of the present invention, together with other and further objects thereof, reference is had to the following description taken in connection with the accompanying drawings, and its scope will be pointed out in the appended claims.

Figure 2:
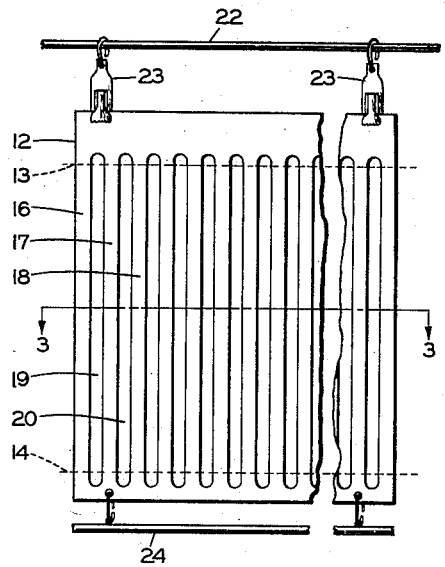
Figure 4:
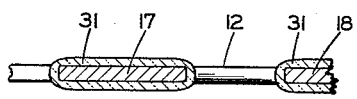
Figure 3:
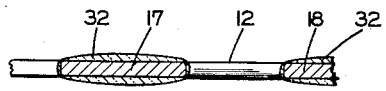
Figure 5:
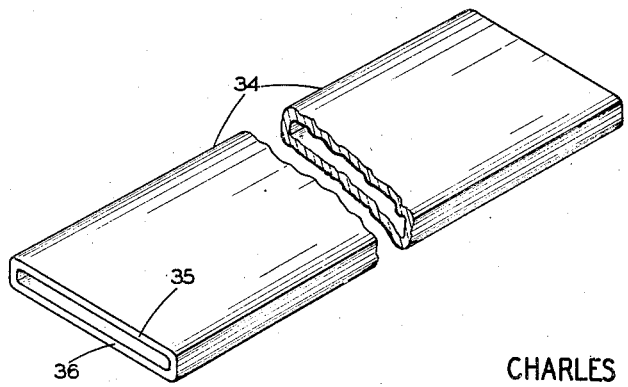

In the drawing, Fig. 1 is a block diagram representing the successive steps in a method embodying the present invention; Fig. 2 is a view of a thin form or core useful in the method of Fig. 1; Fig. 3 is a partial cross-sectional view taken along the line 3—3 of the form illustrated in Fig. 2 after treatment of the form in accordance with several steps in the method of Fig. 1; Fig. 4 is a cross-sectional view corresponding to the view of Fig. 3 but illustrating the effect of the omission of a step in the method of Fig. 1; and Fig. 5 is a perspective view of one of the elongated shapes of ceramic material, obtained by the method represented in Figs. 1–3, shown with the central portion cut away.

Referring now more particularly to Fig. 1 of the drawing, the first step 11 in a method of making shapes of electro-mechanically sensitive ceramic material in accordance with the invention is the punching of a form of unrefractory material such as the form illustrated in Fig. 2. Any of numerous unrefractory materials may be useful. In selecting a suitable material, there should be considered the ease of preparing forms of the desired configuration from the material, the completeness with which it disintegrates at high temperatures, the extent to which a liquid coagulating agent of the type described hereinbelow wets the surface of the material and penetrates thereinto, and the tendency of a strip of the material to curl after dipping in such a coagulating agent. While forms of a plastic material such as cellulose acetate have been used successfully, it now is preferred to use a calendered paper form. If an elongated flat form is desired, a multiple strip form such as that illustrated in Fig. 2 may be punched from a sheet 12 of calendered paper. The portions of the sheet 12 between the imaginary lines 13 and 14 near the top and bottom respectively of the sheet comprise numerous elongated flat strips 16, 17, 18, etc., separated by slots 19, 20, etc., punched out of the sheet 12. To make shapes of the approximate configuration illustrated in Fig. 5 the distance between the lines 13 and 14 may be, for example, about 2½ inches, the width of the strips 16, 17, 18 about ⅛ inch, and the sheet 12 may be about 0.008 inch thick.

For use in the method of the invention there is required a dispersion of a ceramic raw material in a suitable medium, such as an aqueous medium in which is dissolved a small quantity of a dispersing agent. A titanate raw material which produces a coherent body of electro-mechanically sensitive material upon ceramic firing may be used appropriately in forming the dispersion, and the use of a titanate raw material comprising primarily barium titanate is preferred. The dispersion may be formed by mixing and dispersing about 80 parts by weight of barium titanate in about 20 parts by weight of water. To insure proper dispersion of the small particles of solid titanate material in the liquid medium there may be included a small quantity, for example about one part by weight, of a dissolved dispersing agent; a suitable dispersing agent is a sodium derivative of naphthalenesulfonic acid, obtainable under the trade name "Daxad" from the firm of Dewey and Almy of Boston, Massachusetts.

Before the dispersion just described is used, however, it has been found necessary in order to obtain the desired results to apply to the form 12 of unrefractory material an agent for causing coagulation of the ceramic raw material from the dispersion thereof. This may be accomplished by a coagulant dip step, indicated 21 in Fig. 1, in which the form 12 is dipped into a liquid coagulating agent. A preferred coagulating agent for applying to the surface of the form 12 in this manner is an aqueous solution of ammonium pentaborate, $NH_4B_5O_8$, and ethyl alcohol. The alcohol improves the ability of the liquid to wet the surface of the form. A suitable solution may be prepared by mixing saturated aqueous ammonium pentaborate with ethyl alcohol, the alcohol accounting for about one fourth to one half of the volume of the entire solution. Other suitable coagulating agents are concentrated aqueous solutions of formic acid or of acetic acid, diluted with ethyl alcohol or acetone. There also may be used solutions of calcium chloride or calcium nitrate; a solution of about 80% acetone and 20% ethyl alcohol by weight is prepared, and the coagulant is made by dissolving roughly 10% by weight of the calcium salt in the solvent so prepared.

The coagulating solution may be placed in a vat or trough, not shown, and the form 12 suspended therein from a rod 22 by means of clips 23, 23, as shown in Fig. 2. The form 12 may be weighted by attaching a metal bar 24 to the bottom of the form so that it will sink into the liquid dipping baths used in accordance with the invention. The form should remain in the coagulating liquid until any gas bubbles displaced from the paper form by the solution have risen to the surface; this may require about two minutes. When paper forms are used, they should be allowed to dry in the air at room temperature for five to ten minutes after removal from the bath of coagulating agent. Apparently somewhat more of the liquid agent may be absorbed or carried on one side of the form than on the other, and the drying seems to equalize the amounts carried on the two sides and thus tends to prevent subsequent curling or warping of the form. The ethyl alcohol in the coagulating agent accelerates the drying. It may be desirable to include in the coagulating agent a small quantity of an additional organic wetting agent; various wetting agents are known, and the choice of a wetting agent depends, of course, on the material of the form used.

Subsequently to the application of the coagulating agent to the form 12, contact is caused between the agent on the form and a quantity of the titanate dispersion to effect coagulation of a coating of the ceramic raw material on the form. This may be done conveniently by moving the weighted form, suspended from its rod 22, to another vat or trough, not shown, containing the dispersion and dipping the form carrying the coagulating agent into the dispersion. This dispersion dip is represented by step 26 in Fig. 1. Using the barium titanate dispersion and the form 12 described hereinabove, it has been found preferable to dip the form in the dispersion for about one minute, inserting the form rather slowly in the dispersion to avoid turbulence and entrainment of air bubbles. Coagulation of a coating of the barium titanate material on the form is effected by the action of the ammonium pentaborate solution.

Even when using a dispersing agent in the titanate dispersion, it frequently is desirable to agitate the dispersion gently. This is illustrated in Fig. 1 by the step 27 of subjecting the dispersion to mild agitation in a separate container through which it is circulated slowly and then returned to the dispersion-dipping trough. Since appreciable quantities of the dispersion are coagulated on the forms during the step 26, it is necessary in a continuous process to form additional quantities of the dispersion, step 28, for replacement of the titanate material.

The form now is removed slowly from contact with the quantity of the dispersion in the dipping trough. The method should be carried out so that little uncoagulated material from the dispersion remains on the surface of the form; that is, the form is permitted to drain bit by bit as it is removed. However, the removal should not be so slow as to permit coagulation of a materially thicker coating on the bottom portions of the form. Thus the removal should be completed in about one-sixth to one-eighth of the time during which the entire form is submerged. If a stronger coagulating agent were used, both the dipping and the removal could be accomplished more quickly, but the coagulating agent ordinarily should not be so strong as to require quick removal without permitting slow draining of uncoagulated dispersion from the form.

As the form is removed from the dispersion it commences to dry in the air at room temperature. It may be permitted to dry in this way for about one hour, after which it may be dried for about the same period of time in an oven at approximately 50° C. to expel a large part of the liquid medium still remaining in the coating after removal from the liquid dispersion.

To insure formation of a coagulated and dried coating which will adhere together and to the form during subsequent treatment, it may be convenient to use a dispersion which contains a dissolved or dispersed cohesive material such as a polyvinyl alcohol binder. Then the air and oven drying of the coagulated layer on the form, represented by the step 29 in Fig. 1, produces a relatively dry coating bonded by the cohesive material precipitated or coagulated from solution in the dispersing medium. The coagulation or gelling of a cohesive material, for example a polyvinyl alcohol, may assist materially in the formation of the coagulated layer, and may aid not only in forming a layer of desirable thickness but also in minimizing any tendency of a part of the layer of coagulated ceramic material to become redispersed before the form is withdrawn from the dispersion bath. Other conditioning or cohesive materials, capable of being coagulated or precipitated on the form when the coagulating agent thereon is brought into contact with the dispersion, may be included in the dispersion. Among these materials may be mentioned a gum material, for example gum arabic, which may be mixed with the dispersion and which comes out of the solution on the form to serve as a binder, and a latex material, which may be coagulated from the dispersion in the form of a gel along with the ceramic material.

Fig. 3 illustrates two of the strips 17, 18 in cross section with the coagulated coating 31 obtained in a manner described hereinabove. The same strips are shown in cross section in Fig. 4 with a coating of ceramic raw material 32 such as would be obtained if the coagulant dip step 21 had been omitted. It will be noted that, even though the coating 32 has been allowed to accumulate to a considerable thickness in some regions, for example by successive dispersion-dipping and drying operations, the coating is very thin at the edges of the strips. The extent of the non-uniformity of thickness of the coating thus produced depends on the shape of the form used, and the shapes produced by a ceramic-firing operation performed on forms thus coated have been found to be of unpredictable and varying thickness and therefore unsatisfactory for most purposes. Moreover, the quickest and best results are obtained, particularly as regards uniformity of material, by a single dispersion dip, which can be made to produce rather thick coatings by the use of a sufficiently strong coagulating agent.

In the embodiment of the invention illustrated in the drawing, the desired final product of the method of the invention is a number of elongated hollow shapes. These shapes conveniently may be fired separately. Accordingly the coagulant and dispersion dips of steps 21 and 26 should be carried out with immersion of the form 12 only up to the line 13, Fig. 2. After the drying step 29, the portions of the form above the line 13 may be cut away easily to separate the upper ends of the strips 16, 17, 18. The portions of the form below the line 14 also may be cut away with due care to prevent damage to the unfired ceramic raw material on the form; this has been found to be practicable using a sawing or a grinding technique. This step of cutting the strips apart, represented as step 30 in Fig. 1, produces a number of units coated with ceramic raw material.

The separate coated forms 16, 17, 18, etc., then are placed on a refractory surface in a furnace and heated to ceramic-firing temperatures with firing of the coating in a conventional manner and elimination of the unrefractory form to leave coherent shapes of electro-mechanically sensitive polycrystalline ceramic material, in this case barium titanate material. When paper forms are used, the paper volatilizes and burns during the ceramic-firing step, represented as step 33 in Fig. 1, leaving the elongated hollow shape 34 illustrated in Fig. 5. The shape 34 is provided with two opposed wall portions 35 and 36 having the relatively wide and flat configuration of the flat sides of the elongated strips 16, 17, 18 of the form 12. A substantially uniform wall thickness, for example of about 0.010 inch, may be obtained by the method of the invention.

The fired electro-mechanically sensitive titanate material may have any of numerous shapes other than that illustrated in Fig. 5, depending on the shape of the form used. Bodies of titanate material such as that illustrated in Fig. 5 are useful in electro-mechanical transducers. Such transducers are described and claimed in the copending application Serial No. 32,593, filed June 12, 1948, in the name of Alfred L. W. Williams and assigned to the same assignee as the present invention. The shape illustrated in Fig. 5 is well adapted for mounting in a holder, for example a holder for use in the tone arm of a phonograph pick-up, in a manner described and claimed in the copending application Serial No. 32,617, filed June 12, 1948, in the name of Thomas E. Lynch and assigned to the same assignee as the present invention.

While there has been described what at present is considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. The method of making shapes of electro-mechanically sensitive ceramic material comprising, applying to a form of unrefractory material an agent for causing coagulation of a ceramic raw material from a dispersion thereof, subsequently causing contact between said agent on said form and a quantity of said dispersion to effect coagulation of a coating of said ceramic raw material on said form, and heating said coated form to ceramic-firing temperatures with firing of said coating and elimination of said unrefractory form to leave a coherent shape of electro-mechanically sensitive polycrystalline ceramic material.

2. The method of making shapes of electro-mechanically sensitive ceramic material comprising, forming a dispersion of a ceramic raw material in an aqueous medium in which is dissolved a small quantity of a dispersing agent, applying to a form of unrefractory material an agent for causing coagulation of said ceramic raw material from said dispersion, subsequently causing contact between said agent on said form and a quantity of said dispersion to effect coagulation of a coating of said ceramic raw material on said form, and heating said coated form to ceramic-firing temperatures with firing of said coating and elimination of said unrefractory form to leave a coherent shape of electro-mechanically sensitive polycrystalline ceramic material.

3. The method of making shapes of electro-mechanically sensitive ceramic material comprising, dipping a form of unrefractory material into a liquid agent for causing coagulation of a ceramic raw material from a dispersion thereof in a liquid medium, subsequently dipping said form carrying said coagulating agent into said dispersion to effect coagulation of a coating of said ceramic raw material on said form, and heating said coated form to ceramic-firing temperatures with firing of said coating and elimination of said unrefractory form to leave a coherent shape of electro-mechanically sensitive polycrystalline ceramic material.

4. The method of making shapes of electro-mechanically sensitive ceramic material comprising, applying to a calendered paper form a liquid agent for causing coagulation of a ceramic raw material from a dispersion thereof, subsequently causing contact between said agent on said form and a quantity of said dispersion to effect coagulation of a coating of said ceramic raw material on said form, and heating said coated form to ceramic-firing temperatures with firing of said coating and volatilization of said paper form to leave a coherent shape of electro-mechanically sensitive polycrystalline ceramic material.

5. The method of making shapes of electro-mechanically sensitive ceramic material comprising, applying to an elongated form of unrefractory material an agent for causing coagulation of a ceramic raw material from a dispersion thereof, subsequently causing contact between said agent on said form and a quantity of said dispersion to effect coagulation of a coating of said ceramic raw material on said form, and heating said coated form to ceramic-firing temperatures with firing of said coating and elimination of said unrefractory form to leave a coherent elongated hollow shape of electro-mechanically sensitive polycrystalline ceramic material.

6. The method of making shapes of electro-mechanically sensitive ceramic material comprising, applying to an elongated flat form of unrefractory material an agent for causing coagulation of a ceramic raw material from a dispersion thereof, subsequently causing contact between said agent on said form and a quantity of said dispersion to effect coagulation of a coating of said ceramic raw material on said form, and heating said coated form to ceramic-firing temperatures with firing of said coating and elimination of said unrefractory form to leave a coherent elongated hollow shape of electro-mechanically sensitive polycrystalline ceramic material with two opposed wall portions having the relatively wide and flat configuration of the flat sides of said elongated form.

7. The method of making shapes of electro-mechanically sensitive ceramic material comprising, applying to the surface of a form of unrefractory material an aqueous ammonium pentaborate solution for causing coagulation of a ceramic raw material from a dispersion thereof, subsequently causing contact between said form and a quantity of said dispersion to effect coagulation by said ammonium pentaborate solution of a coating of said ceramic raw material on said form, and heating said coated form to ceramic-firing temperatures with firing of said coating and elimination of said unrefractory form to leave a coherent shape of electro-mechanically sensitive polycrystalline ceramic material.

8. The method of making shapes of electro-mechanically sensitive ceramic material comprising, applying to the surface of a form of unrefractory material an aqueous solution of ammonium pentaborate and ethyl alcohol for causing coagulation of a ceramic raw material from a dispersion thereof, subsequently causing contact between said form and a quantity of said dispersion to effect coagulation by said ammonium pentaborate solution of a coating of said ceramic raw material on said form, and heating said coated form to ceramic-firing temperatures with firing of said coating and elimination of said unrefractory form to leave a coherent shape of electro-mechanically sensitive polycrystalline ceramic material.

9. The method of making shapes of electro-mechanically sensitive ceramic material comprising, applying to a form of unrefractory material an agent for causing coagulation of a titanate raw material from a dispersion thereof, subsequently causing contact between said agent on said form and a quantity of said dispersion to effect coagulation of a coating of said titanate raw material on said form, and heating said coated form to ceramic-firing temperatures with firing of said coating and elimination of said unrefractory form to leave a coherent shape of electro-mechanically sensitive polycrystalline titanate material.

10. The method of making shapes of electro-mechanically sensitive ceramic material comprising, applying to a form of unrefractory material an agent for causing coagulation of a titanate raw material from a dispersion thereof, subsequently causing contact between said agent on said form and a quantity of a dispersion of a titanate raw material comprising primarily barium titanate to effect coagulation of a coating of said titanate raw material on said form, and heating said coated form to ceramic-firing temperatures with firing of said coating and elimination of said unrefractory form to leave a coherent shape of polycrystalline barium titanate material.

11. The method of making shapes of electro-mechanically sensitive ceramic material comprising, applying to a form of unrefractory material an agent for causing coagulation of a ceramic raw material from a dispersion thereof in a liquid medium, subsequently causing contact between said agent on said form and a quantity of said dispersion to effect coagulation of a coating of said ceramic raw material on said form, removing said form from contact with said quantity of said dispersion and drying said form to expel a large part of the liquid medium still remaining in said coating, and heating said coated form to ceramic-firing temperatures with firing of said coating and elimination of said unrefractory form to leave a coherent shape of electro-mechanically sensitive polycrystalline ceramic material.

12. The method of making shapes of electro-mechanically sensitive ceramic material comprising, applying to a form of unrefractory material an agent for causing coagulation of a ceramic raw material from a dispersion thereof in a liquid medium, subsequently causing contact between said agent on said form and a quantity of said dispersion which contains a cohesive material to effect coagulation of a coating of said ceramic raw material on said form, and heating said coated form to ceramic-firing temperatures with firing of said coating and elimination of said unrefractory form to leave a coherent shape of electro-mechanically sensitive polycrystalline ceramic material.

13. The method of making shapes of electro-mechanically sensitive ceramic material comprising, applying to a form of unrefractory material an agent for causing coagulation of a ceramic raw material from a dispersion thereof in a liquid medium, subsequently causing contact between said agent on said form and a quantity of said dispersion which contains a dissolved cohesive material to effect coagulation of a coating of said ceramic raw material and of said cohesive material on said form, and heating said coated form to ceramic-firing temperatures with firing of said coating and elimination of said unrefractory form to leave a coherent shape of electro-mechanically sensitive polycrysalline ceramic material.

14. The method of making shapes of electro-mechanically sensitive ceramic material comprising, applying to a form of unrefractory material an agent for causing coagulation of a ceramic raw material from a dispersion thereof in a liquid medium, subsequently causing contact between said agent on said form and a quantity of said dispersion which contains a cohesive material to effect coagulation of a coating of said ceramic raw material on said form, removing said form from contact with said quantity of said dispersion and drying said form to expel a large part of the liquid medium still remaining in said coating and produce a relatively dry coating bonded by said cohesive material, and heating said coated form to ceramic-firing temperatures with firing of said coating and elimination of said unrefractory form to leave a coherent shape of electro-mechanically sensitive polycrystalline ceramic material.

15. The method of making shapes of electro-mechanically sensitive ceramic material comprising, applying to a form of unrefractory material an agent for causing coagulation of a ceramic raw material from a dispersion thereof in a liquid medium, subsequently causing contact between said agent on said form and a quantity of said dispersion which contains a dissolved cohesive material to effect coagulation of a coating of said ceramic raw material and of said cohesive material on said form, removing said form from contact with said quantity of said dispersion and drying said form to expel a large part of the liquid medium still remaining in said coating and produce a relatively dry coating bonded by said cohesive material, and heating said coated form to ceramic-firing temperatures with firing of said coating and elimination of said unrefractory form to leave a coherent shape of electro-mechanically sensitive polycrystalline ceramic material.

CHARLES K. GRAVLEY.

REFERENCES CITED

The following references are of record in the file of this patent:

UNITED STATES PATENTS

| Number | Name | Date |
| --- | --- | --- |
| 1,825,736 | Klein | Oct. 6, 1931 |
| 1,996,072 | King | Apr. 2, 1935 |
| 2,171,006 | Morgan et al. | Aug. 29, 1939 |
| 2,348,935 | Smith et al. | May 16, 1944 |